Patented July 15, 1941

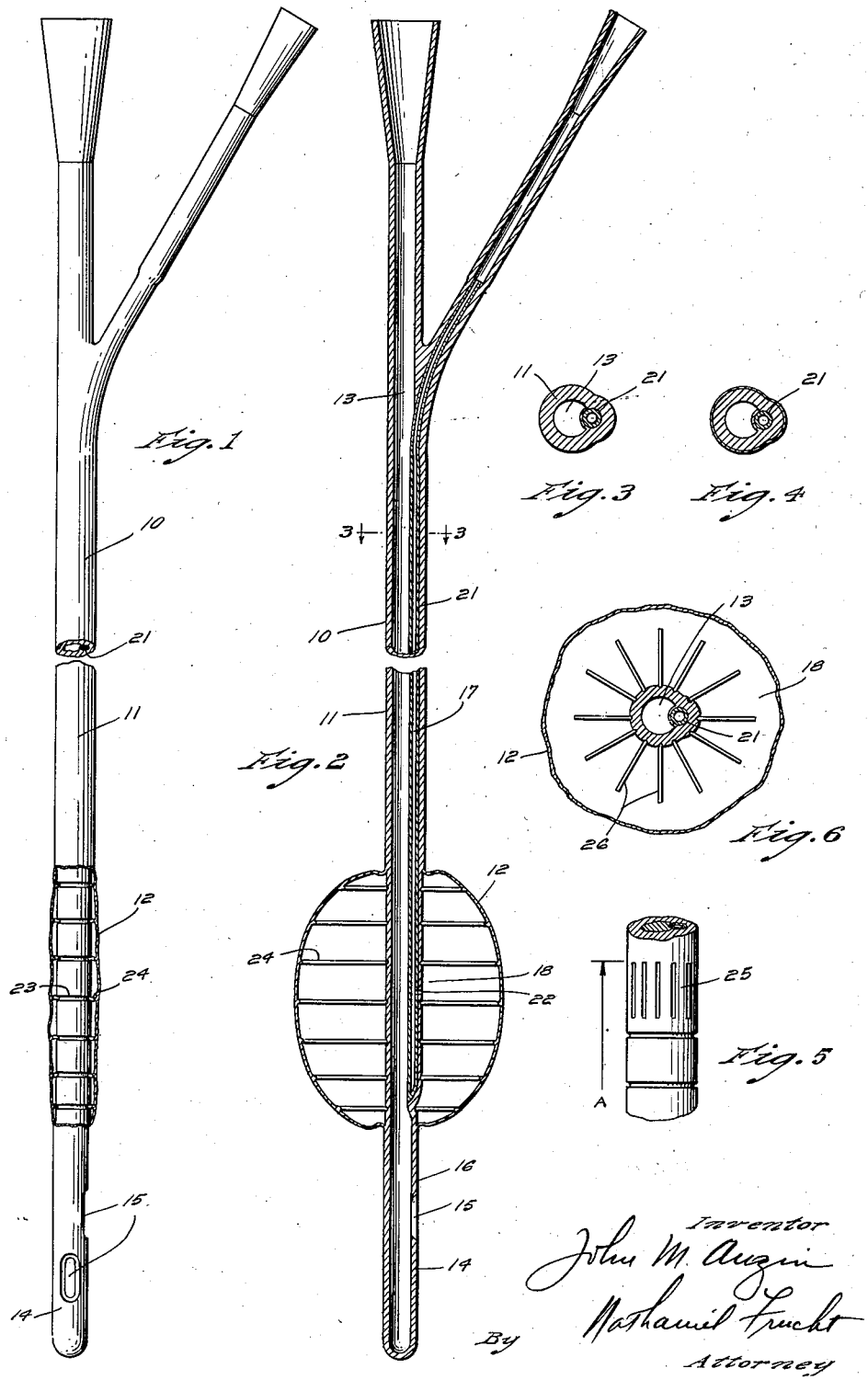

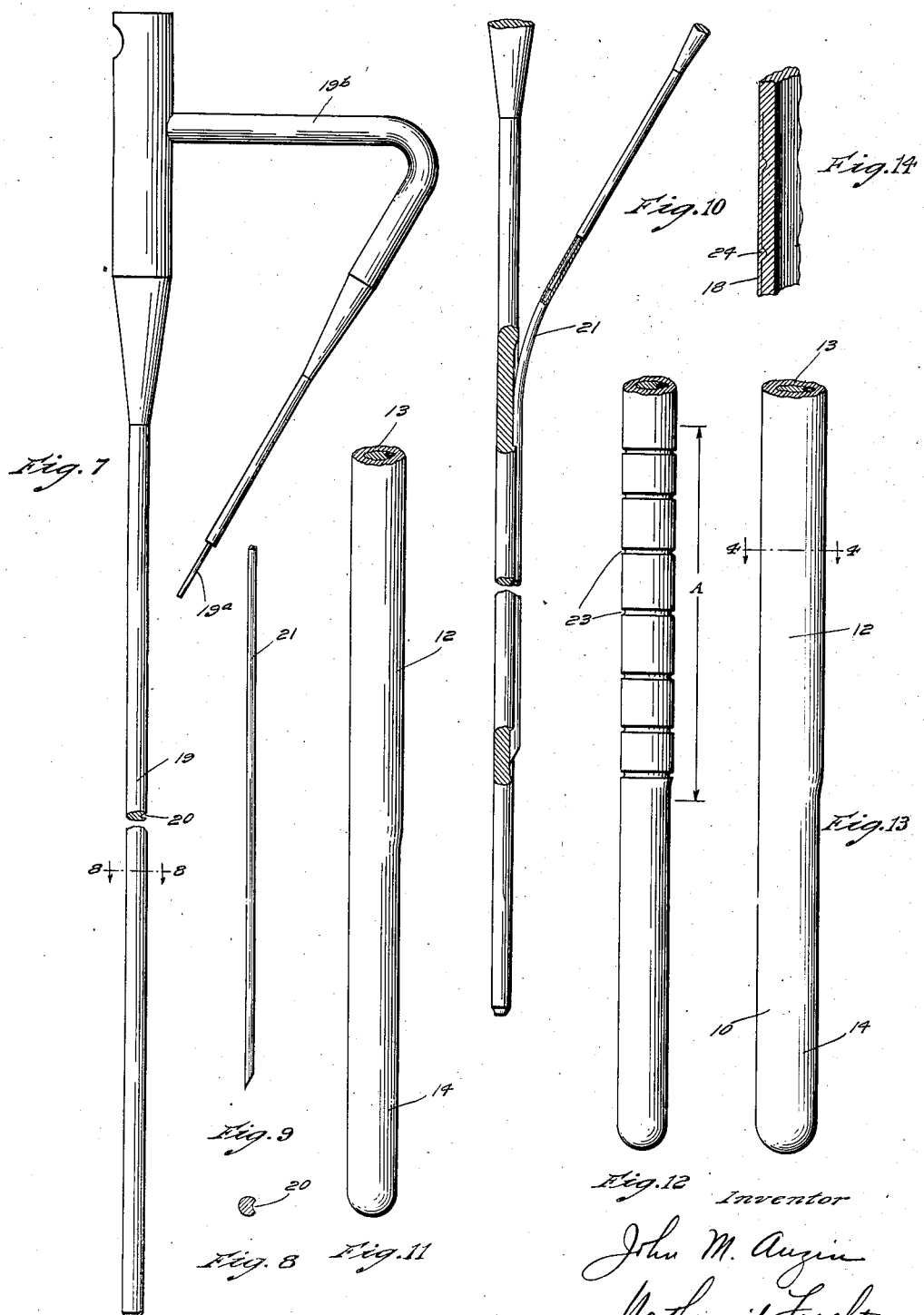

2,248,934

UNITED STATES PATENT OFFICE 2,248,934

INFLATABLE CATHETER

John M. Auzin, Warwick, R. I., assignor to Davol Rubber Company, a corporation of Rhode Island Application December 24, 1937, Serial No. 181,632

11 Claims. (Cl. 18—58)

My present invention relates to the manufacture of rubber articles and has particular reference to catheters of the inflatable type.

It is the principal object of my invention to provide an improved catheter of the inflatable type, which will inflate uniformly with respect to the catheter tubing.

It is a further object of my invention to provide an inflatable catheter having reinforcing ribs.

It is an additional object of my invention to improve the method of manufacture of an inflatable catheter.

With the above and other objects and advantageous features in view, my invention consists of a novel catheter construction and a novel method of manufacture more fully disclosed in the detailed description following, in conjunction with the accompanying drawings, and more specifically defined in the claims appended thereto.

In the drawings,

Fig. 1 is a view, partly broken away, of an inflatable catheter constructed in accordance with my invention, the catheter being deflated;

Fig. 2 is a similar view, the catheter being inflated.

Fig. 3 is a section on the line 3—3 of Fig. 2;

Fig. 4 is a similar view on the line 4—4 of Fig. 13;

Fig. 5 is a view showing the next forming steps for the catheter;

Fig. 6 is a sectional detail of a completed catheter;

Fig. 7 is an elevation of the catheter former;

Fig. 8 is a section on 8—8 of Fig. 7;

Fig. 9 is an elevation of the inflation tube;

Fig. 10 is a view of the former, partly in section, with the inflation tube thereon;

Fig. 11 is a fragmentary view showing a partially formed catheter;

Fig. 12 is a similar view with grooves formed thereon;

Fig. 13 is a similar view of a completed catheter; and

Fig. 14 is an enlarged fragmentary sectional view of the catheter wall.

Referring to the drawings, the novel catheter 10 includes a tubular section 11 and an inflatable balloon section 12, preferably made as an integral one piece device, the tubular section having a central longitudinal flow passage 13 terminating at the tip end 14 and having one or more fluid ducts 15 through the section wall 16 as shown in Fig. 2, the wall 16 has a longitudinal passageway 17 which terminates in a wall recess 18 formed between the balloon section and the wall.

The improved catheter is preferably formed as a one-piece article by dipping a former 19, see Fig. 7, being used, having a longitudinal groove 20. This former is dipped in rubber solution, either natural or synthetic, until a thin rubber layer is obtained. Then a rubber tube 21 is coated with rubber cement, and is inserted in the grooved portion over the formed layer; the tube is bevelled off at the lower end, the opening therein being plugged with a drop of rubber, preferably latex. The upper end is inserted over a pin 19a on a funnel forming arm 19b which is secured to and is part of the end of the former 19, this pin sealing the lower end so that no rubber can enter the tube, and facilitating the formation of an integral funnel end for the upper end of the inflation tube. Since the pin has an initial rubber coat as the result of the first dippings, this coat is removed from the pin before the end of the tube is pushed over it. The dipping is continued, a small drop of coloring matter being applied after each dip to mark the end of the tube 21, in order to mark the place for making the desired connecting opening. When the catheter has been sufficiently built up, the form and the catheter are placed in a cold bath, a hole being burned through the wall at the colored spots to make the connecting opening 22 to the interior of the tube 21, the preferred spacing being just below the tube end, to avoid making the opening through the marking ink. The form, and the catheter are removed from the cold water bath, surface dried with cheese cloth or the like, and the region A, see Fig. 12, where the balloon is to be formed, is grooved as indicated at 23, by using any suitable tool for impressing the soft rubber, as for example a dull edged tool or the like.

The catheter in the region marked A is then treated with a local adhesive preventing agent, to surface treat this region and prevent adhesion of later dips thereto; the local agent is then washed off, and the catheter is placed back in the cold water bath. This treatment leaves a surface area which is clean, and yet prevents adherence of the subsequently dipped coatings. The cold water bath has the effect of preventing uneven drying of the rubber, thus facilitating the production of a uniform thickness for the balloon which is subsequently formed. Each catheter is taken out of the cold water bath, and surface dried with the cheese cloth; the opening or hole 22 is closed or plugged with a drop of latex, and the catheter is again dipped, the resultant layer or layers thus forming a balloon at the region A, as there is no adhesion with the previous layers of rubber. If desired, a layer of rubber cement may be applied at each end of the region A, to ensure a perfect adhesion and an integral joining. The rubber enters the grooves 23, to form thickened portions or ribs 24, see Fig. 14.

The completed catheter is air dryed, stripped from the form, and is put in a drying tray and additionally dried. It is then put in a hot water bath, approximately 80° C., to leach out water soluble proteins from the rubber; then the balloon is loosened by pumping air or water under slight pressure into the passageway 17, and the end of the passageway 17 is plugged so as to keep the balloon slightly distended. The inflation of the balloon removes the latex or rubber drop or plug from the hole 22, the plug adhering to the inner wall of the balloon, and clearing the passageway 17.

The catheter is slowly dried for a long period preferably under natural conditions, and is then vulcanized to be ready for use. The ribs 24 serve as strengthening ribs, and produces an even spread or ballooning of the catheter when inflated, and the balloon has a better shape because the ribs prevent bulging of thin portions.

Although any adhesion preventing agent may be used to coat the section A before dipping to form the balloon, I prefer bromine as the chemical agent, as it has a tackiness removing action on the rubber. Bromine solution may be used, but I have found that the solution has a tendency to creep beyond the desired limits, and I therefore use the bromine in the form of a paste, obtained by mixing bromine solution with a neutral powder such as Dixie clay. Another local treating agent is bleaching water to which a little sulphuric acid has been added; this is preferably also mixed with a neutral powder such as Dixie clay to form a paste.

Figs. 1, 2 and 12 illustrate my invention as utilizing parallel ribs on the balloon element; any desired form of ribs, which may for example, be spiral or cross grooves, may be used instead, but parallel grooves produce a more attractive appearance when the balloon is inflated. If desired, longitudinal grooves 25, see Fig. 5, may be formed at one or both ends of the region A, on the partly finished catheter before local adhesion-preventing treatment, and the resulting balloon ribs 26, see Fig. 6, serve to strengthen the balloon at the area adjacent its juncture with the main body of the catheter. These longitudinal ribs resist longitudinal stretch of the balloon, and permit lateral stretch of the balloon.

My novel invention thus includes the formation of internal grooves on the balloon portion of an inflatable catheter, which result in a better, more even, and uniform inflation. While I have described a specific manner for forming the ribs, suitable for use with a dipping process for forming a one piece integral inflatable catheter, and have described specific means for preventing local adhesion during the balloon formation, it is obvious that the principles and the structure disclosed may be used for other types of catheters and other forms of rubber articles, without departing from the spirit and the scope of the invention as defined in the appended claims.

I claim:

1. In the manufacture of a rubber article having a recess, the steps of forming a deformable rubber base, making indentations in a selected area only of the surface thereof and treating the selected area thereof to prevent adhesion, the area around the selected area being untreated to remain as an adhering area, and forming a rubber coating over the treated area, said rubber coating being integrally joined to the untreated adhering area.

2. In the manufacture of a rubber article having a recess, the steps of forming a deformable rubber base, making indentations in a selected area only of the surface thereof and treating the selected area thereof to prevent adhesion, the area around the selected area being untreated to remain as an adhering area, and forming a rubber coating by dipping over the treated area, said rubber coating being integrally joined to the untreated adhering area.

3. In the manufacture of a rubber article having a recess, the steps of forming a deformable rubber base, making grooves in a selected area only of the surface thereof and treating the selected area thereof to prevent adhesion, the area around the selected area being untreated to remain as an adhering area, and forming a rubber coating over the treated area, said rubber coating being integrally joined to the untreated adhering area.

4. In the manufacture of a rubber article having a recess, the steps of forming a deformable rubber base, making indentations in a selected area only of the surface thereof and treating the selected area thereof to prevent adhesion, the area around the selected area being untreated to remain as an adhering area, forming a rubber coating over the treated area, said rubber coating being integrally joined to the untreated adhering area, and retaining said article in a cold water bath between the said steps to prevent uneven drying.

5. In the manufacture of a rubber article having a recess, the steps of forming a deformable rubber base, making indentations in a selected area only of the surface thereof and treating the selected area thereof with an adhesion preventing material to prevent adhesion, the area around the selected area being untreated to remain as an adhering area, and forming a rubber coating over the treated area, said rubber coating being integrally joined to the untreated adhering area.

6. In the manufacture of an inflatable catheter, the steps of forming a rubber base to provide a longitudinal flow channel and a passage in the wall thereof for inflating fluid, forming an opening in said wall leading to said passage, treating a selected area only of the surface thereof including said opening to prevent adhesion and forming indentations in the treated area, the area around the selected area being untreated to remain as an adhering area, and forming a rubber lining over the treated area, said rubber lining being integrally united to the untreated adhering area.

7. In the manufacture of an inflatable catheter, the steps of forming a rubber base to provide a longitudinal flow channel and a passage in the wall thereof for inflating fluid, forming an opening in said wall leading to said passage, treating a selected area only of the surface thereof including said opening to prevent adhesion and forming indentations in the treated area, the area around the selected area being untreated to remain as an adhering area, plugging said treated opening with a rubber plug, and forming a rubber lining over the treated area, said rubber lining being integrally united to the untreated adhering area and to the rubber plug.

8. In the manufacture of an inflatable catheter, the steps of forming a rubber base to provide a longitudinal flow channel and a passage in the wall thereof for inflating fluid, forming an opening in said wall leading to said passage, treating a selected area only of the surface thereof including said opening to prevent adhesion and forming grooves in the treated area, the area around the selected area being untreated to remain as an adhering area, and forming a rubber lining over the treated area, said rubber lining being integrally united to the untreated adhering area.

9. In the manufacture of an inflatable catheter, the steps of forming a rubber base to provide a longitudinal flow channel and a passage in the wall thereof for inflating fluid, forming an opening in said wall leading to said passage, treating a selected area only of the surface thereof including said opening to prevent adhesion and forming parallel grooves in the treated area, the area around the selected area being untreated to remain as an adhering area, and forming a rubber lining over the treated area, said rubber lining being integrally united to the untreated adhering area.

10. In the manufacture of an inflatable catheter, the steps of forming a rubber base to provide a longitudinal flow channel and a passage in the wall thereof for inflating fluid, forming an opening in said wall leading to said passage, treating a selected area only of the surface thereof including said opening to prevent adhesion and forming indentations in the treated area terminating adjacent the edges thereof, the area around the selected area being untreated to remain as an adhering area, and forming a rubber lining over the treated area, said rubber lining being integrally united to the untreated adhering area.

11. In the manufacture of an inflatable catheter, the steps of forming a rubber base to provide a longitudinal flow channel and a passage in the wall thereof for inflating fluid, forming an opening in said wall leading to said passage, treating a selected area only of the surface thereof including said opening to prevent adhesion and forming indentations in the treated area, the area around the selected area being untreated to remain as an adhering area, said indentations comprising parallel grooves in the selected area intermediate the upper and lower portions thereof, and longitudinal grooves adjacent the upper and lower portions thereof, and forming a rubber lining over the treated area, said rubber lining being integrally united to the untreated adhering area.

JOHN M. AUZIN.